(12) United States Patent
Song et al.

(10) Patent No.: US 11,337,170 B2
(45) Date of Patent: May 17, 2022

(54) METHOD AND DEVICE FOR TRANSMITTING OR RECEIVING DATA IN WIRELESS COMMUNICATION SYSTEM

(71) Applicant: LG Electronics Inc., Seoul (KR)

(72) Inventors: Huayue Song, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 71 days.

(21) Appl. No.: 16/652,819

(22) PCT Filed: Oct. 2, 2018

(86) PCT No.: PCT/KR2018/011699
§ 371 (c)(1),
(2) Date: Apr. 1, 2020

(87) PCT Pub. No.: WO2019/070101
PCT Pub. Date: Apr. 11, 2019

(65) Prior Publication Data
US 2020/0236638 A1 Jul. 23, 2020

Related U.S. Application Data

(60) Provisional application No. 62/567,208, filed on Oct. 2, 2017.

(51) Int. Cl.
*H04W 56/00* (2009.01)
*H04W 72/04* (2009.01)
*H04L 5/00* (2006.01)

(52) U.S. Cl.
CPC ........... *H04W 56/001* (2013.01); *H04L 5/001* (2013.01); *H04W 72/04* (2013.01)

(58) Field of Classification Search
CPC .............. H04L 5/001; H04W 56/0015; H04W 72/0453; H04W 72/04
See application file for complete search history.

(56) References Cited

U.S. PATENT DOCUMENTS

2017/0332362 A1* 11/2017 Li .......................... H04W 72/12
2020/0084773 A1*  3/2020 Li ..................... H04W 72/0453
(Continued)

FOREIGN PATENT DOCUMENTS

WO    WO2017135593    8/2017

OTHER PUBLICATIONS

Intel Corporation, "Remaining aspects for carrier aggregation and bandwidth parts," R1-1716327, 3GPP TSG RAN WG1 Meeting NR#3, Nagoya, Japan, dated Sep. 18-21, 2017, 9 pages.
(Continued)

*Primary Examiner* — Raj Jain
(74) *Attorney, Agent, or Firm* — Fish & Richardson P.C.

(57) ABSTRACT

The present disclosure provides a method for transmitting and receiving data based on a grid of a common resource block (RB) in a wireless communication system. More specifically, the method performed by a user equipment includes receiving a synchronization block from a base station; receiving, from the base station, first offset information representing an offset between a lowest subcarrier of a lowest resource block of the SSB and a first reference point based on a specific subcarrier spacing; receiving, from the base station, control information including information on the specific subcarrier spacing and information on a difference between a subcarrier spacing based reference point, to which the SSB is received, and the first reference point; and configuring a grid of a common resource block based on the first offset information and the control information.

6 Claims, 8 Drawing Sheets

(56) References Cited

U.S. PATENT DOCUMENTS

| | | | | |
|---|---|---|---|---|
| 2020/0137736 A1* | 4/2020 | Du | | H04W 72/042 |
| 2020/0163037 A1* | 5/2020 | Zheng | | H04L 5/0078 |
| 2020/0229180 A1* | 7/2020 | Liu | | H04W 72/0453 |
| 2020/0236638 A1* | 7/2020 | Song | | H04L 5/00 |
| 2020/0252934 A1* | 8/2020 | Xue | | H04L 5/0001 |
| 2021/0203463 A1* | 7/2021 | Li | | H04W 24/00 |

OTHER PUBLICATIONS

LG Electronics, "RMSI delivery and CORESET configuration," R1-1715842, 3GPP TSG RAN WG1 Meeting NR#3, Nagoya, Japan,, dated Sep. 18-21, 2017, 9 pages.

Samsung, "Remaining Issues on the NR Mobility," R1-1715915, 3GPP TSG RAN WG1 Meeting NR#3, Nagoya, Japan, dated Sep. 18-21, 2017, 15 pages.

Vivo, "Remaining issues on SS block and SS burst set composition," R1-1715606, 3GPP TSG RAN WG1 NR Ad-Hoc#3, Nagoya, Japan, dated Sep. 18-21, 2017, 7 pages.

* cited by examiner

METHOD AND DEVICE FOR TRANSMITTING OR RECEIVING DATA IN WIRELESS COMMUNICATION SYSTEM

CROSS-REFERENCE TO RELATED APPLICATIONS

This application is a National Stage filing under 35 U.S.C. 371 of International Application No. PCT/KR2018/011699, filed on Oct. 2, 2018, which claims the benefit of U.S. Provisional Application No. 62/567,208, filed on Oct. 2, 2017, the contents of which are all hereby incorporated by reference herein in their entirety.

TECHNICAL FIELD

The present disclosure relates to a wireless communication system, and more particularly to a method for transmitting and receiving data and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure provides a method of providing additional offset information for determining a reference point when a system bandwidth increases due to an increase in a performance of a system.

The present disclosure also provides a method of using information of PRB0 corresponding to a common reference point for each numerology.

The technical problems to be solved by the present disclosure are not limited by the above-mentioned technical problems, and other technical problems which are not mentioned above can be clearly understood from the following description by those skilled in the art to which the present disclosure pertains.

Technical Solution

In one aspect, there is provided a method for transmitting and receiving data based on a grid of a common resource block (RB) in a wireless communication system.

More specifically, the method performed by a user equipment (UE) comprises receiving a synchronization block (SSB) from a base station; receiving, from the base station, first offset information representing an offset between a lowest subcarrier of a lowest resource block of the SSB and a first reference point based on a specific subcarrier spacing; receiving, from the base station, control information including information on the specific subcarrier spacing and information on a difference between a subcarrier spacing based reference point, to which the SSB is received, and the first reference point; configuring a grid of a common resource block (RB) based on the first offset information and the control information; and transmitting and receiving the data to and from the base station based on the common RB grid.

The method further comprises receiving, from the base station, second offset information representing an additional offset related to an offset between the lowest subcarrier of the lowest resource block of the SSB and a second reference point.

The additional offset represents an offset between the first reference point and the second reference point.

The additional offset is configured within in a bandwidth part (BWP) configured to the UE.

When a starting location of the configured BWP exceeds the first reference point, the second offset information representing the additional offset is received from the base station.

The first offset information and the control information are received from the base station through system information.

The system information is remaining minimum system information (RMSI).

In another aspect, there is provided a method for transmitting and receiving, by a base station, data in a wireless communication system, the method comprising transmitting a synchronization block (SSB) to a user equipment (UE); transmitting, to the UE, first offset information representing an offset between a lowest subcarrier of a lowest resource block of the SSB and a first reference point based on a specific subcarrier spacing; transmitting, to the UE, control information including information on the specific subcarrier spacing and information on a difference between a subcarrier spacing based reference point, to which the SSB is received, and the first reference point; and transmitting and receiving the data to and from the UE based on a grid of a common resource block (RB).

The method further comprises transmitting, to the UE, second offset information representing an additional offset related to an offset between the lowest subcarrier of the lowest resource block of the SSB and a second reference point.

In another aspect, there is provided a user equipment (UE) for transmitting and receiving data in a wireless communication system, the UE comprising a radio frequency (RF) module configured to transmit and receive a radio signal; and a processor functionally connected to the RF module, wherein the processor is configured to receive a synchronization block (SSB) from a base station; receive, from the base station, first offset information representing an offset between a lowest subcarrier of a lowest resource block of the SSB and a first reference point based on a specific subcarrier spacing; receive, from the base station, control information including information on the specific subcarrier spacing and information on a difference between a subcarrier spacing based reference point, to which the SSB is received, and the first reference point; configure a grid of a common resource block (RB) based on the first offset information and the control information; and transmit and receive the data to and from the base station based on the common RB grid.

Advantageous Effects

The present disclosure has an effect of capable of forming a common PRB grid by providing additional offset information for determining a reference point when a system bandwidth increases due to an increase in a performance of a system.

The present disclosure has an effect of capable of preventing a signalling overhead by using information of PRB0 corresponding to a common reference point for each numerology.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

MODE FOR INVENTION

Figure 1:
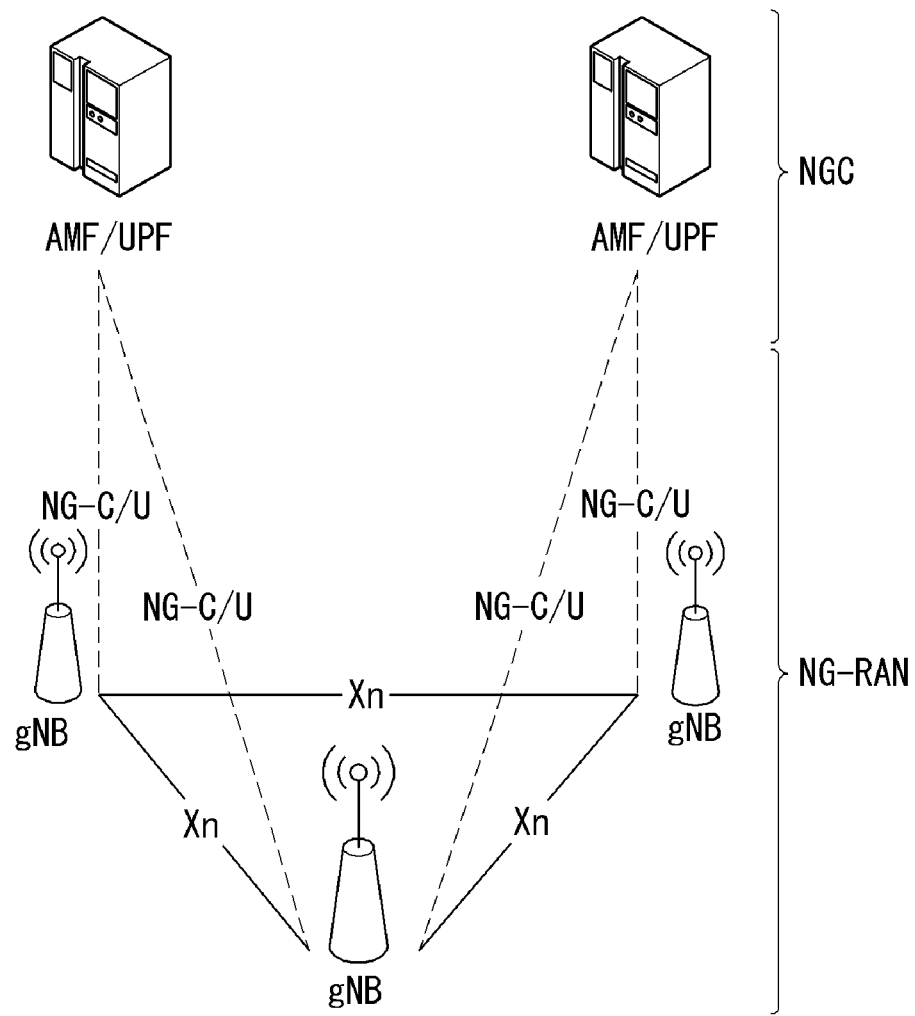
FIG. 1 illustrates an example of an overall structure of a NR system to which a method described in the present disclosure is applicable.

In what follows, preferred embodiments of the present disclosure will be described in detail with reference to appended drawings. Detailed descriptions to be disclosed below with reference to the appended drawings are intended to describe illustrative embodiments of the present disclosure but are not intended to represent the sole embodiment of the present disclosure. Detailed descriptions below include specific details to provide complete understanding of the present disclosure. However, it should be understood by those skilled in the art that the present disclosure may be embodied without the specific details to be introduced.

In some cases, to avoid obscuring the gist of the present disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The 5G NR defines enhanced Mobile Broadband (eMBB), massive Machine Type Communication (mMTC), Ultra-Reliable and Low Latency Communications (URLLC), and vehicle-to-everything (V2X) depending on usage scenarios.

And the 5G NR standard is divided into standalone (SA) and non-standalone (NSA) modes according to co-existence between the NR system and the LTE system.

And the 5G NR supports various subcarrier spacing and supports CP-OFDM for downlink transmission while CP-OFDM and DFT-s-OFDM (SC-OFDM) for uplink transmission.

The embodiments of the present disclosure may be supported by standard documents disclosed for at least one of wireless access systems such as the IEEE 802, 3GPP, and 3GPP2. In other words, those steps or portions among embodiments of the present disclosure not described to clearly illustrate the technical principles of the present disclosure may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present disclosure are not limited to the specific system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
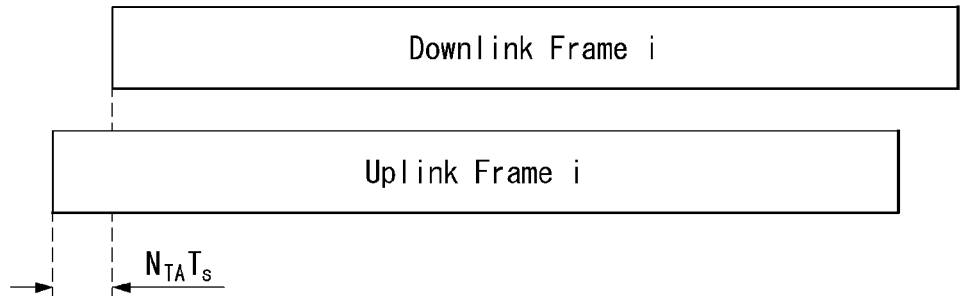
FIG. 2 illustrates a relation between an uplink frame and a downlink frame in a wireless communication system to which a method described in the present disclosure is applicable.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^{\mu} \in \{0, \ldots, N_{subframe}^{slots,\mu}-1\}$ in a subframe, and in ascending order of $n_{s,f}^{\mu} \in \{0, \ldots, N_{frame}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu} N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot Configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot Configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
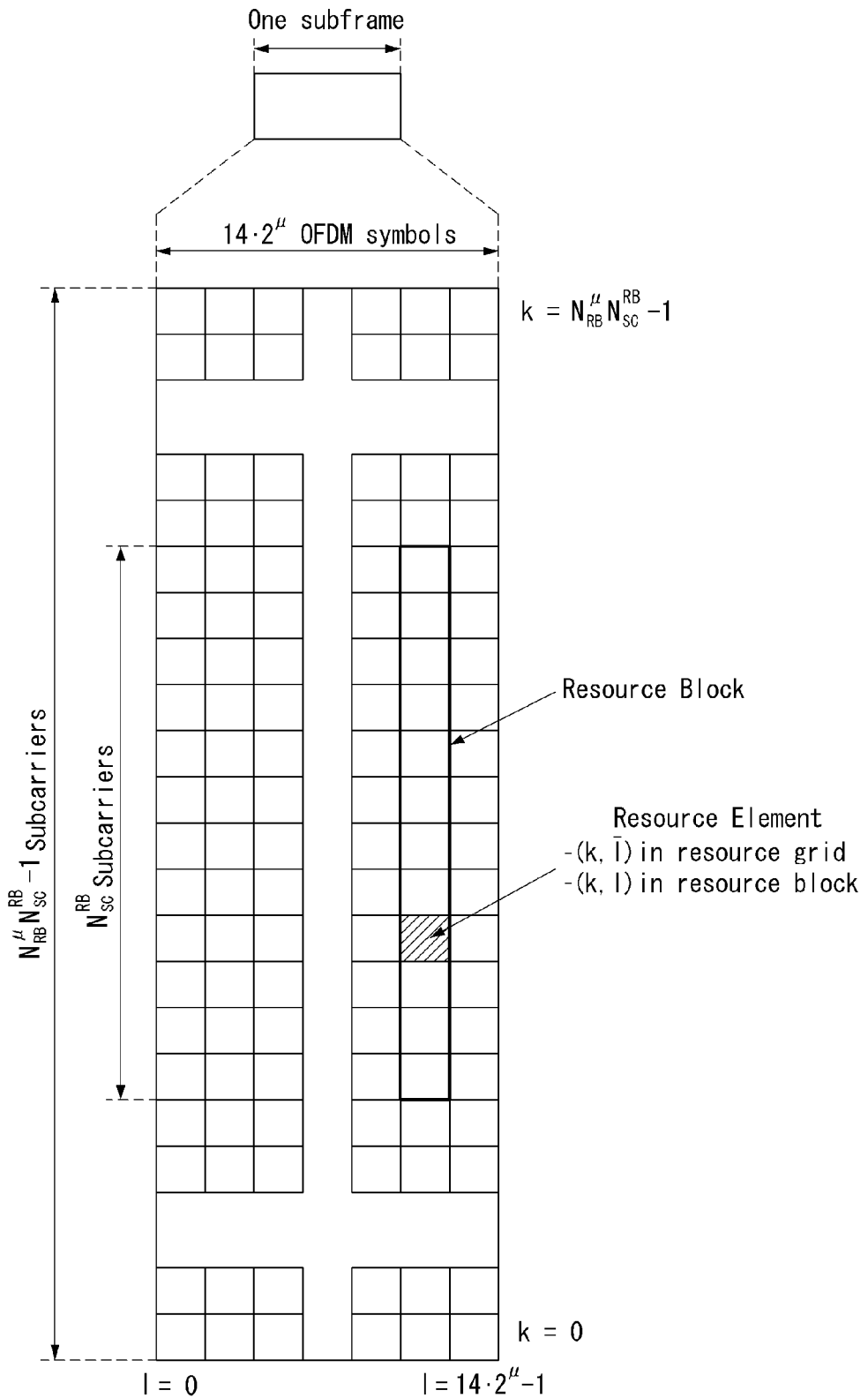
FIG. 3 illustrates an example of a resource grid supported in a wireless communication system to which a method described in the present disclosure is applicable.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of 14·2$\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured per the numerology $\mu$ and an antenna port p.

Each element of resource grid for the numerology $\mu$ and the antenna port p is called a resource element and is uniquely identified by an index pair (k,l̄), where k=0, . . . , $N_{RB}^{\mu} N_{sc}^{RB}-1$ is an index on a frequency domain, and l̄=0, . . . , $2^{\mu} N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element (k,l̄) for the numerology $\mu$ and the antenna port p corresponds to a complex value $a_{k,l̄}^{(p,\mu)}$. When there is no risk for confusion or when a specific antenna port or numerology is not specified, the indexes p and $\mu$ may be dropped, and as a result, the complex value may be $a_{k,l̄}^{(p)}$ or $a_{k,l̄}$.

A physical resource block is defined as $N_{sc}^{RB}=12$ consecutive subcarriers on the frequency domain. On the frequency domain, physical resource blocks are numbered from 0 to $N_{RB}^{\mu}-1$. A relation between a physical resource block number $n_{PRB}$ on the frequency domain and the resource elements (k,l) is given by Equation 1.

$$n_{PRB} = \left\lfloor \frac{k}{N_{sc}^{RB}} \right\rfloor \qquad \text{[Equation 1]}$$

In regard to a carrier part, a UE may be configured to receive or transmit the carrier part using only a subset of the resource grid. In this instance, a set of resource blocks which the UE is configured to receive or transmit are numbered from 0 to $N_{URB}^{\mu}-1$ on the frequency domain.

Self-Contained Subframe Structure

Figure 4:
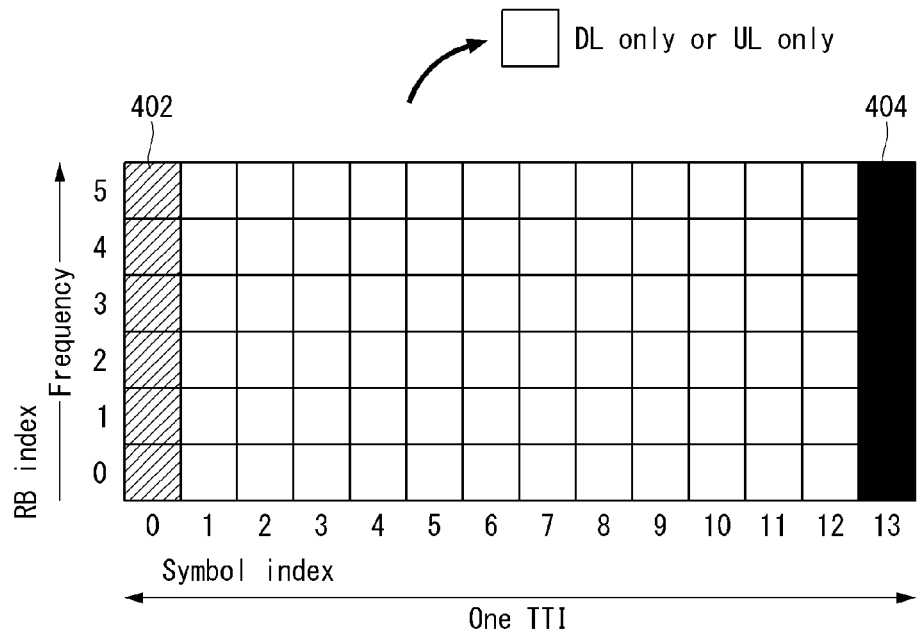
FIG. 4 illustrates an example of a self-contained subframe structure to which a method described in the present disclosure is applicable.

FIG. 4 illustrates an example of a self-contained subframe structure in a wireless communication system to which the present disclosure is applicable.

In order to minimize data transmission latency in a TDD system, 5th generation (5G) new RAT considers a self-contained subframe structure as illustrated in FIG. 4.

In FIG. 4, a hatched portion (symbol index 0) represents a downlink (DL) control area, and a black portion (symbol index 13) represents an uplink (UL) control area. A non-hatched portion may be used for DL data transmission or for UL data transmission. Such a structure is characterized in that DL transmission and UL transmission are sequentially performed in one subframe, and thus the transmission of DL data and the reception of UL ACK/NACK can be performed in the subframe. As a result, this structure can reduce time required to retransmit data when a data transmission error occurs, and hence minimize a latency of final data transfer.

In the self-contained subframe structure, a time gap is necessary for a base station and a UE to switch from a transmission mode to a reception mode or to switch from the reception mode to the transmission mode. To this end, some OFDM symbols at a time of switching from DL to UL in the self-contained subframe structure are configured as a guard period (GP).

Analog Beamforming

Since a wavelength is short in a millimeter wave (mmW), multiple antenna elements can be installed in the same size of area. That is, a wavelength in the frequency band of 30 GHz is 1 cm, and thus a total of 64 (8×8) antenna elements can be installed in two-dimensional arrangement at intervals of 0.5 lambda (i.e., wavelength) on 4×4 (4 by 4) cm panel. Therefore, in the mmW, the coverage can be enhanced or a throughput can be increased by increasing a beamforming (BF) gain using the multiple antenna elements.

In this case, if a transceiver unit (TXRU) is included so that a transmission power and a phase can be adjusted for each antenna element, independent beamforming for each frequency resource is possible. However, it is not cost-efficient to install the TXRU at each of about 100 antenna elements. Thus, a method is considered to map a plurality of antenna elements to one TXRU and adjust a direction of beam using an analog phase shifter. Such an analog BF method has a disadvantage that a frequency selective BF cannot be performed since only one beam direction can be made over the entire frequency band.

Hybrid BF may be considered, which is an intermediate form between digital BF and analog BF and has B TXRUs that is less than Q antenna elements in terms of the number. In this case, even if there is a difference in methods of connecting the B TXRUs and the Q antenna elements, the number of directions of beams that can be transmitted at the same time is restricted to B or less.

'new release' or 'evolution of release' or 'increase in release' used in the present disclosure may mean a future communication system evolved after Release 15 or an improvement in a performance of a communication system, and may include a system with a wider bandwidth than a system of Release 15.

Further, synchronization (SS)/physical broadcast channel (PBCH), SSB, and SS block used in the present disclosure may represent a resource block including PSS, SSS and PBCH and may be interpreted as the same meaning.

Further, a network used in the present disclosure may be interpreted as the same meaning as a base station.

The maximum number of subcarriers of a NR radio access (NR) system is 3,300, and this corresponds to 275 physical resource blocks (PRBs).

A bandwidth corresponding to each subcarrier spacing may be 50 MHz (15 kHz subcarrier spacing), 100 MHz (30 kHz subcarrier spacing), and 200 MHz (60 kHz subcarrier spacing).

In the NR system, a UE accesses the network and then forms a common PRB grid.

To this end, the UE receives, from the base station, information of PRB0 that is a reference point.

The reference point may be interpreted as the same meaning as point A defined in the standard documents.

The point A serves as a common reference point for a resource block grid and may be obtained as follows.

offsetToPointA for PCell downlink represents a frequency offset between the point A and a lowest subcarrier of a lowest resource block of a SS/PBCH block used by the UE for initial cell selection, and is expressed in units of resource blocks assuming 15 kHz subcarrier spacing for FR1 (below 6 GHz) and 60 kHz subcarrier spacing for FR2 (above 6 GHz).

absoluteFrequencyPointA represents frequency-location of the point A expressed as in absolute radio-frequency channel number (ARFCN).

That is, the information of the reference point PRB0 is an offset from a SS/PBCH block (SSB), that the UE accesses, to PRB0 and is expressed as an integer multiple of PRB.

The base station may configure the offset with a total of 9 bits in order to reduce signaling overhead when transmitting information on the offset to the UE.

In this case, the offset of 9 bits may express up to 512 PRBs.

However, the configured resource (a total of 9 bits, up to 512 PRBs) may be insufficient to be used for subsequent release (or subsequent communication system).

This reason is that an offset from a SS block to PRB0 may further increase because the network (or the base station) or the UEs supporting the new release can support a larger bandwidth.

Thus, the present disclosure provides a common PRB indexing method and an offset configuration method for solving a problem not capable of representing the offset as the release evolves as described above.

That is, the present disclosure provides a solution when a configured offset value is out of the representable range because a bandwidth supportable by a system increases according to the evolution of release (or future system), when the UE receives an offset value from the SS block in order to use common PRB indexing in a wideband system.

Hereinafter, the method described in the present disclosure is described in more detail through various embodiments.

First Embodiment

A first embodiment relates to common PRB indexing for bandwidth part (BWP) configuration.

In a NR system, the common PRB indexing may be used for a base station to configure a bandwidth part (BWP) to a UE or configure a RS sequence to the UE.

However, as a bandwidth of a communication system increases, a size of the above-described offset increases. Therefore, all the offset cannot be represented by 9 bits.

A plurality of methods for solving the problem is described below.

(Method 1)

In a wideband, multiple SS blocks may exist, and the SS block may be additionally configured as a performance of the system is improved (or as a system bandwidth increases).

In this instance, a release-15 UE may be configured not to access the network in the added SS block in order to maintain existing common PRB indexing.

This can be performed by different sync raster configurations or the use of a new sync sequence.

When the release-15 UE is allowed to be able to access the added SS block in the wide wideband, the network may transmit, to the UE, indication information indicating whether the release-15 UE uses the corresponding SS block (or added SS lock).

The UE may determine whether to use the (added) SS block based on the indication information.

When the UE cannot use the added SS block (e.g., when the UE receives an out-of-range indication from the base station), the UE can perform a procedure of searching a new SS block.

In order to reduce the search procedure of the SS block for the UE, the network may indicate locations of other SS blocks in the SS block that the release-15 UE can access and cannot use.

When the release-15 UE cannot perform any additional processing, the network may configure as follows.

The network may transmit an offset from PRB0 to the SS block using remaining minimum system information (RMSI) and transmit additional offset information using another RMSI or other system information (OSI).

In this case, the release-15 UE forms the above-described (common) PRB grid based on an offset received from first RMSI.

Afterwards, the release-15 UE may receive additional offset information and form a wider (common) PRB grid.

Figure 5:
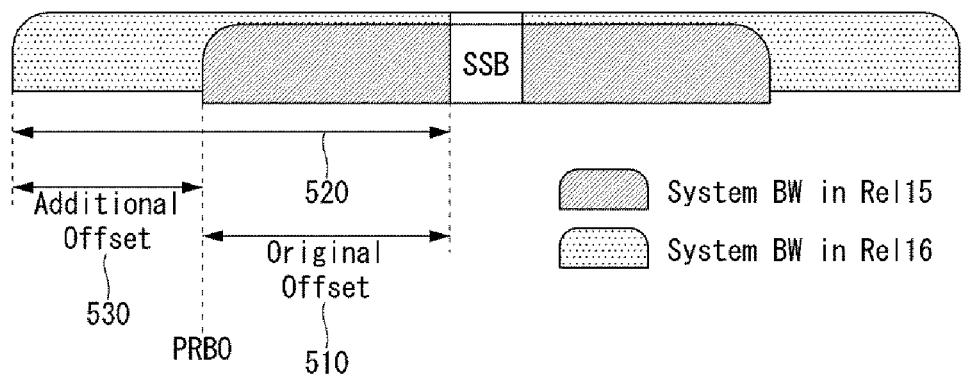
FIG. 5 illustrates an example of a method of configuring an additional offset described in the present disclosure.

FIG. 5 illustrates an example of a method of configuring an additional offset described in the present disclosure.

In FIG. 5, '510' denotes an offset (original offset) of a SS block and PRB0 in a release-15 system, and '520' denotes an offset of the SS block and PRB0 in a system (Release 16) subsequent to Release 15.

That is, '520' may represent a sum of the offset (original offset) in Release 15 and the additional offset 530.

The method 1 can reduce a processing overhead of the release-15 UE, but the network should understand release version information for the UEs.

(Method 2)

Method 2 relates to a method of configuring, by the UE, an additional offset described in the method 1 when one bandwidth part is configured to the UE.

Before describing the method 2, a method related to the BWP configuration is briefly described.

The UE receives, from the network, information related to initial BWP configuration including at least one DL BWP and one or two UL BWP(s) (if supplementary uplink (SUL) is used) through a master information block (MIB).

After the initial BWP configuration, the UE may be configured with an additional BWP from the network.

A method of configuring an additional BWP to the UE from the network and a method of transmitting and receiving a signal between the UE and the network based on the configured BWP are described.

The UE receives, from the network, information related to additional BWP configuration via RRC signaling.

The UE receives, from the network, information related to BWP switching for at least one configured BWP via a PDCCH.

Here, the BWP switching means an operation of activating an inactive BWP or inactivating an active BWP, and may be performed by the PDCCH.

The UE transmits and receives signals (control and/or data) to and from the network in the active BWP based on the received PDCCH.

The UE may transmit and receive signals to and from the network through one or more active BWPs.

Describing again the method 2, the UE accesses the network using the SS block and then receives a location f0 of PRB0, that is a reference point (or point A) for using common PRB indexing, from RMSI received from the network.

However, as release increases (as a bandwidth of the system increases), an end of an actual available bandwidth of the UE may be located beyond f0. That is, if the network signals the reference point to all the UEs based on the existing Release 15, Release UEs after Release 15 may be restricted to use as much as the bandwidth supported to the Release 15 UEs in spite of capable of using a larger bandwidth.

Therefore, a configuration method for allowing the Release UEs after Release 15 to use a larger bandwidth is required.

In the above case, when the network configures a bandwidth part to the corresponding UE, the network may configure an additional offset if a starting point (a frequency location (or RB location) at which the corresponding bandwidth part starts) of the corresponding bandwidth part exceeds the reference point.

The above-described method has the advantage of not increasing any overhead in the existing Release 15 UEs and not affecting that Release UEs after Release 15 form the common PRB grid.

However, in order for the release UEs after Release 15 to use a wider range of bandwidth, signalling for the additional offset may be necessary as in the above-described method.

Here, the additional offset value (or offset bit or offset field) may be configured using the RMSI, or may be configured UE-specific.

If the additional offset value is configured based on the RMSI, the additional offset value may use a reserved field of the RMSI.

Alternatively, when the network configures the additional offset value, the network may include an indication bit for the subsequent release, configure the indication bit of "0" to the Release-15 UE, and then configure the indication bit of another value to the subsequent release UE.

If the offset value is configured UE-specific, the network may transmit RRC signaling to the UE, and the UE may receive corresponding information via the corresponding RRC signaling.

In the above-described method, i.e., if a basic offset is configured using the RMSI and an additional offset is configured via RRC signaling, the following two options may be considered.

(Option 1)

When the additional offset is reconfigured via RRC, initial access related configuration (including initial BWP) proceeds based on the RMSI.

(Option 2)

If RRC re-configuration of the UE ends, and the UE is in a (RRC) connected mode, the network may configure the additional offset to RMSI based common PRB indexing.

Figure 6:
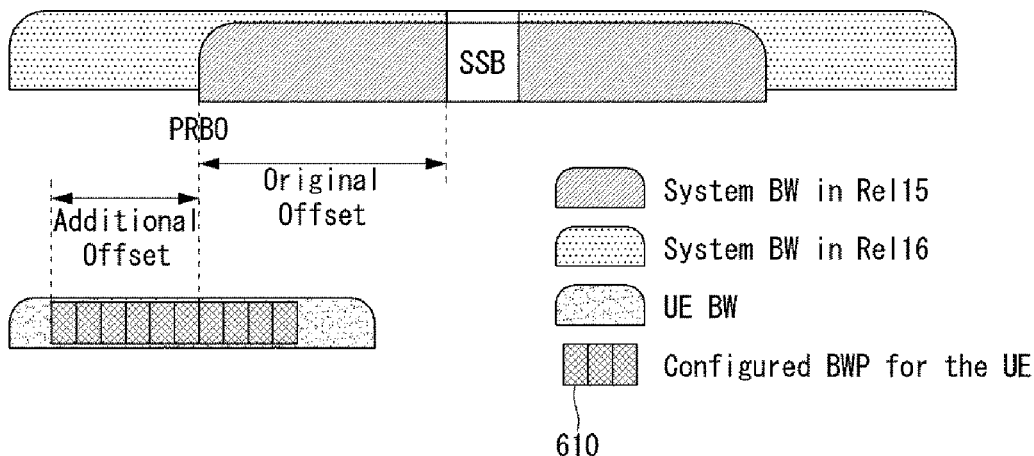
FIG. 6 illustrates an example of addition offset configuration for a BWP described in the present disclosure.

FIG. 6 illustrates an example of addition offset configuration for a BWP described in the present disclosure.

Referring to FIG. 6, the additional offset may be configured considering a BWP of the UE, i.e., inside BWP (610) of the UE.

The additional offset indication method described in the method 2 can be applied when the measurement configuration as well as the BWP configuration are performed.

(Method 3)

Method 3 relates to a method of configuring multiple 'partial' common PRB indexing in a system wideband.

Figure 7:
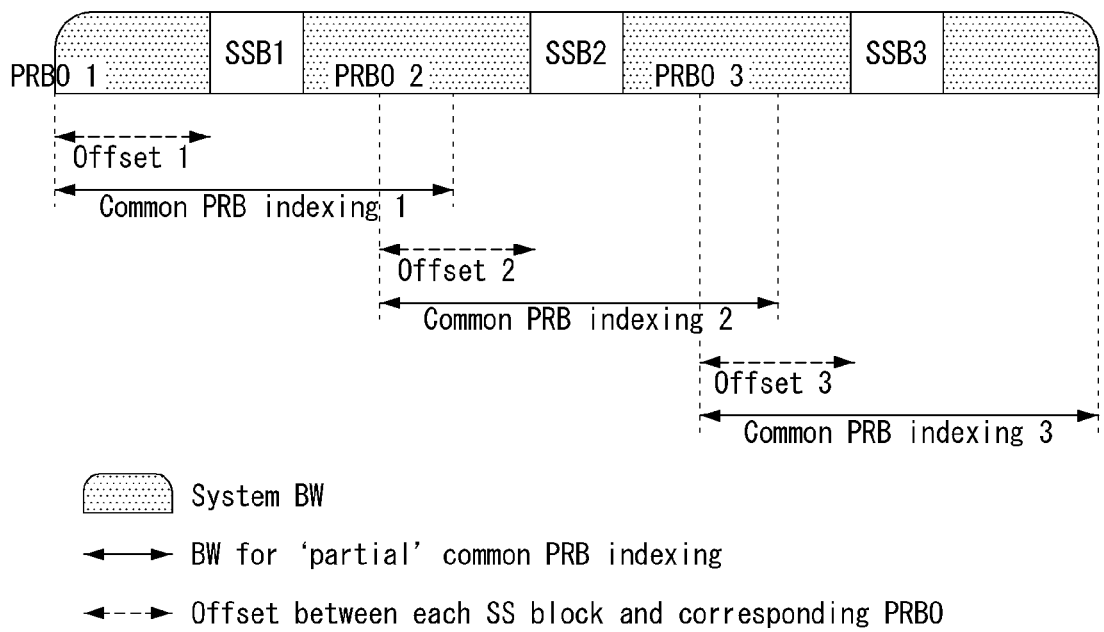
FIG. 7 illustrates an example of a partial common PRB indexing configuration method described in the present disclosure.

FIG. 7 illustrates an example of a partial common PRB indexing configuration method described in the present disclosure.

Referring to FIG. 7, a wideband (or system BW) may be divided into three sections, and common PRB indexing may be configured in each section.

The network may signal an offset (offset 1, offset 2, and offset 3) from each SS block to corresponding PRB0 to UEs accessing the network.

When the BWP is configured according to the method 3, the Release-15 UE forms a (common) PRB grid using an offset received based on the SS block that the Release-15 UE accesses, and receives BWP configuration from the network based on it.

In order for the network to move the UE to another section, the network may command the UE to perform an intra-frequency measurement.

Here, it may be assumed that a measurement object is QCLed (quasi-co location) with a currently accessed SS block.

With regard to it, the QCL and an antenna port are briefly described.

First, the antenna port is defined so that a channel on which a symbol on the antenna port is carried can be deduced from a channel on which another symbol on the same antenna port is carried.

If properties of a channel on which a symbol on one antenna port is carried can be inferred from a channel on which a symbol on another antenna port is carried, the two antenna ports may have a QCL (quasi co-located or quasi co-location) relationship.

Here, the channel properties include at least one of delay spread, Doppler spread, frequency shift, average received power, received riming, or spatial RX parameter. Here, the spatial RX parameter means the same spatial (receive) channel characteristic parameter as an angle of arrival.

For example, in BW section 1 (110), measurement for BW section 2 (120) in which a UE using common PRB indexing is QCLed with SS block 1 may be performed. In case of handover, the UE may receive new offset information from SS block 2 of the BW section 2 to form new (common) PRB indexing, and BWP configuration may be performed using the new (common) PRB indexing.

Second Embodiment

A second embodiment relates to a method of indicating a common offset for different numerologies.

A NR system may support various numerologies, and a UE accessing the NR system may use common PRB indexing corresponding to each numerology.

That is, it is assumed that the UE receives an indication for a reference point from the network and then is configured with a bandwidth part from the network.

In this instance, if the configured bandwidth part has subcarrier spacing attributes of 15 kHz, the UE checks a location of the bandwidth part configured with the common PRB indexing formed using 15 kHz subcarrier spacing.

Alternatively, if the configured bandwidth part has subcarrier spacing attributes of 30 kHz, the UE checks a location of the bandwidth part configured with the common PRB indexing formed using 30 kHz subcarrier spacing.

In order to use the common PRB indexing, the UE receives, from the network, an offset value from the SS block accessing the UE to PRB0.

In this instance, if the corresponding offset value is expressed based on a fixed one numerology, PRB0 based on each numerology may not be aligned at one location according to a system bandwidth.

To this end, if the network transmits, to the UE, one offset based on each numerology, there is a problem that signaling overhead occurs.

Thus, in order to prevent the signaling overhead from occurring, the second embodiment provides a method of interpreting, by the UEs, the offset for each numerology while providing the same offset to the UEs and calculating the offset from the SS block to PRB0.

As described below, the second embodiment may roughly consist of two steps, and each step is as follows.

(Step 1)

When the network signals, to the UE, a subcarrier offset aligning grid of floating sync and PRB grid for data, the network may indicate, to the UE, which numerology based PRB grid the offset is.

The UE first performs a SSB detection process in order to access the network.

The SSB detection process is a process checking whether a SSB exists at predetermined frequency intervals, and the predetermined frequency interval is defined by channel raster.

The channel raster has a value configured for each band. For example, a channel raster value of band n1 may be 100 kHz, and a channel raster value of band n41 may be 15 kHz or 30 kHz.

Here, when the UE performs the SSB detection process using 100 kHz channel raster, 100 kHz is not an integer multiple of one PRB range (frequency of 12 subcarriers) and thus is not agreed with a PRB grid for the actual transmission and reception. Hence, a predetermined subcarrier offset may exist.

In this case, a detected SS block is called a floating SS block. Here, a procedure of aligning grid of floating sync and PRB grid for data may include a process in which the UE obtains DL synchronization through a synchronization procedure and then receives a SSB subcarrier offset through system information (e.g., MIB) to align grid of SSB and PRB grid for data to be received subsequently.

Since the offset between the floating sync and the data PRB grid described above is in units of subcarrier, the offset may be up to 11 subcarriers.

This reason is that 1 PRB includes 12 subcarriers. In this case, the offset may be expressed by 4 bits.

This case is a case where all of subcarrier spacings of the floating sync and the data PRB grid are 15 kHZ.

However, if the subcarrier spacing of the floating sync is 15 kHz and the subcarrier spacing of the data PRB grid is 30 kHz and 60 kHz, the offset may have up to 23 and 47 subcarriers.

In this case, the offset values may be expressed by 5 bits and 6 bits, respectively.

Thus, the UE can determine a PRB indication from a format of the offset.

That is, the UE may check a size of the offset and then know which numerology based offset value an indicated offset (value indicated in RMSI) (from SSB) to PRB0 is.

In other words, if the SS block has the 15 kHz subcarrier spacing, and a subcarrier offset of the SS block consists of 4 bits, a PRB0 offset value to be subsequently received means the number of PRBs based on the 15 kHz subcarrier spacing.

Alternatively, if the subcarrier offset of the SS block consists of 5 bits, a PRB0 offset value to be subsequently received means the number of PRBs based on the 30 kHz subcarrier spacing.

Figure 8:
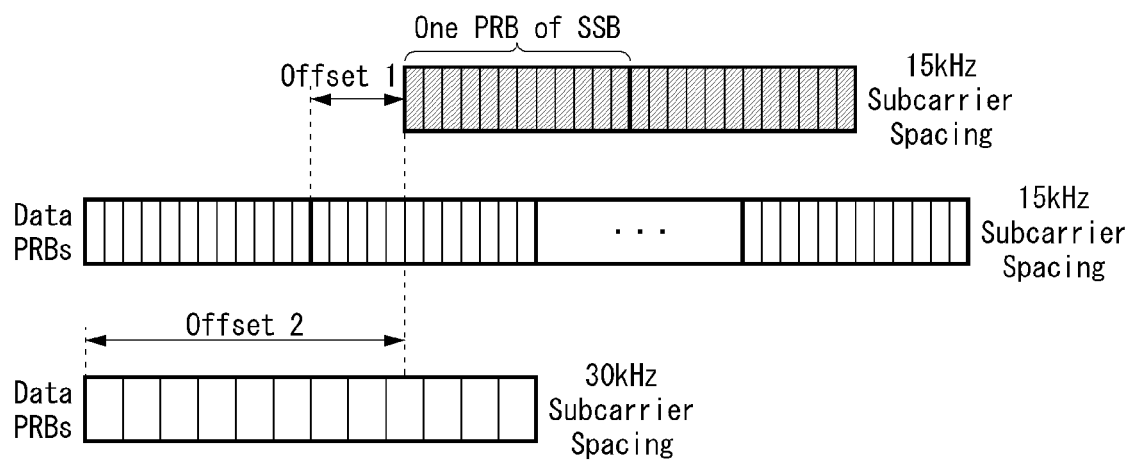
FIG. 8 illustrates an example of different subcarrier offsets between floating sync. and data PRB in different numerologies.

FIG. 8 illustrates an example of different subcarrier offsets between floating sync and data PRB in different numerologies.

More specifically, FIG. 8 illustrates an example of representing offsets between a SS block having a 15 kHz subcarrier spacing and data PRBs respectively having 15 kHz and 30 kHz subcarrier spacings.

(Step 2)

The UE can calculate an offset between a SS block and PRB0 based on a numerology indicated in the above-described step 1.

Figure 9:
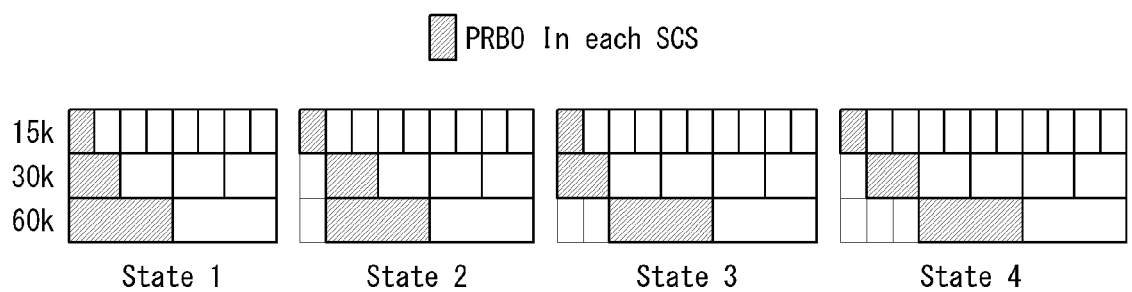
FIG. 9 illustrates a PRB grid situation of a bandwidth end portion that may occur according to a system bandwidth when a PRB grid has been formed using each numerology.

FIG. 9 illustrates a PRB grid situation of a BW end portion that may occur according to a system BW when a PRB grid has been formed using each numerology.

The UE receives, from the network, PRB0 related offset information based on one type of numerology (indicated from floating sync offset information).

Here, the numerology may be the same as or different from a numerology of a PRB grid to be formed by the UE.

In addition, the UE may form a PRB grid that is actually used using the received offset.

For example, when the UE using the 15 kHz subcarrier spacing receives offset information of a sync block, the UE has received information (offset 2 information of FIG. 8) of 30 kHz subcarrier spacing (SCS) based PRB alignment and then receives an offset value (including a state in information) to PRB0 in RMSI.

That is, the corresponding offset value represents the number of PRBs consisting of the 30 kHz subcarrier spacing.

The UE can calculate PRB0 corresponding to a numerology (15 kHz SCS) that the UE uses.

Here, the state is expressed by 2 bits and may be included in an offset value of RMSI or may represent the corresponding state by designating another field.

If the corresponding state is included in an offset value, first 2 bits or last 2 bit of the offset value bit field may be represented as a PRB state, and remaining bits may be interpreted as the number of PRBs.

If the UE receives offset value=20 and state="01", the offset value may represent the number of PRBs based on the 30 kHz subcarrier spacing as described above, and the state value may represent State 2 in FIG. 9.

In the corresponding case, a PRB grid of each numerology shows configuration in a carrier end portion.

As illustrated in FIG. 9, PRB0 based on the 30 kHz subcarrier spacing and PRB0 based on the 60 kHz subcarrier spacing are aligned, and PRB0 based on the 15 kHz subcarrier spacing represent that one PRB is shifted compared to the 30 kHz and 60 kHz subcarrier spacings.

In this case, the UE may recognize that an actual location of PRB0 is "offset value*2+1=20*2+1=41" based on a numerology (15 kHz) of the UE. That is, since one PRB based on the 30 kHz subcarrier spacing corresponds to two PRBs based on the 15 kHz subcarrier spacing, this may be represented by "offset value*2", and "+1" represents that PRB0 based on the 15 kHz subcarrier spacing has been shifted by 1PRB compared to PRB0 based on the 30 kHz subcarrier spacing according to the indicated state value.

In the same situation, actual PRB0 of the UE using the 60 kHz subcarrier spacing and an offset value of SSB may be 20/2=10.

Two PRBs based on the 30 kHz subcarrier spacing may represent one PRB based on the 60 kHz subcarrier spacing, and PRB0 based on the 30 kHz subcarrier spacing and PRB0 based on the 60 kHz subcarrier spacing are aligned in the State 2. Therefore, "+1" or "−1" is not represented.

The first and second embodiments described above can be separately implemented, and can be combined and implemented.

Figure 10:
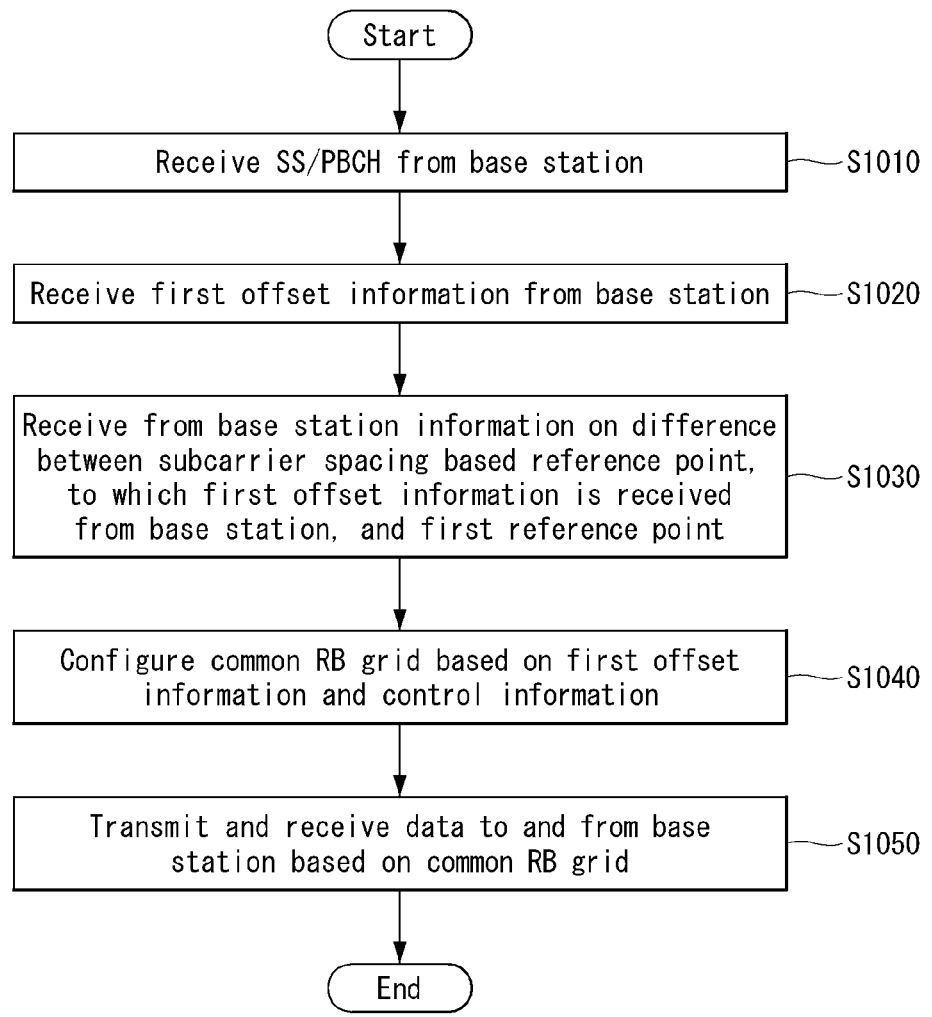
FIG. 10 illustrates an example of an operation method of a UE implementing a method described in the present disclosure.

FIG. 10 illustrates an example of an operation method of a UE implementing a method described in the present disclosure.

More specifically, FIG. 10 illustrates an operation of a UE for transmitting and receiving data based on a grid of a common resource block (RB) in a wireless communication system.

First, a UE receives a synchronization block (SSB) from a base station in S1010.

The UE receives, from the base station, first offset information representing an offset between a lowest subcarrier of a lowest resource block of the SSB and a first reference point based on a specific subcarrier spacing in S1020.

The UE receives, from the base station, control information including information on the specific subcarrier spacing and information on a difference between a subcarrier spacing based reference point, to which the SSB is received, and the first reference point in S1030.

The UE configures a grid of a common resource block (RB) based on the first offset information and the control information in S1040.

The UE transmits and receives data to and from the base station based on the common RB grid in S1050.

In addition, if a wider system bandwidth is supported in the network and the UE, the UE may receive, from the base station, second offset information representing an additional offset related to an offset between the lowest subcarrier of the lowest resource block of the SSB and a second reference point.

The additional offset represents an offset between the first reference point and the second reference point.

The additional offset may be configured within a bandwidth part (BWP) configured to the UE.

More specifically, when a starting location of the configured BWP exceeds the first reference point, the second offset information representing the additional offset may be received from the base station.

The first offset information and the control information may be received from the base station through system information, and the system information may be RMSI.

Figure 11:
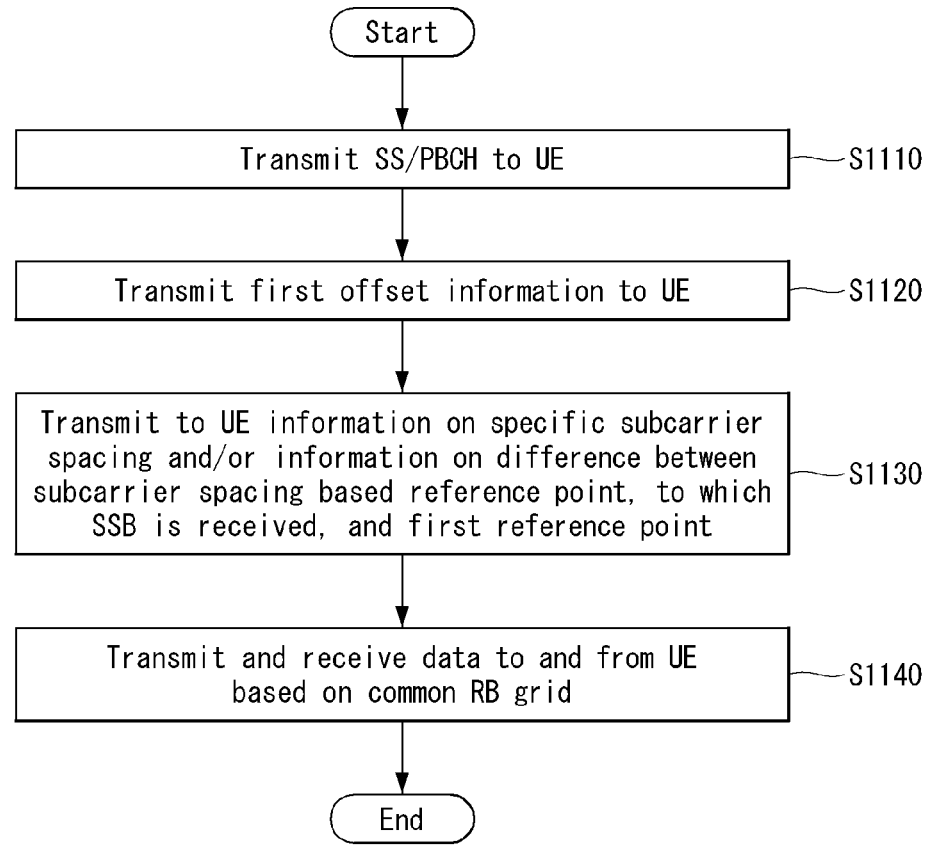
FIG. 11 illustrates an example of an operation method of a base station implementing a method described in the present disclosure.

FIG. 11 illustrates an example of an operation method of a base station implementing a method described in the present disclosure.

First, a base station transmits a synchronization block (SSB) to a UE in S1110.

The base station transmits, to the UE, first offset information representing an offset between a lowest subcarrier of a lowest resource block of the SSB and a first reference point based on a specific subcarrier spacing in S1120.

The base station transmits, to the UE, control information including information on the specific subcarrier spacing and information on a difference between a subcarrier spacing based reference point, to which the SSB is received, and the first reference point in S1130.

The base station transmits and receives data to and from the UE based on a grid of a common resource block (RB) in S1140.

In addition, if a wider system bandwidth is supported in the base station and the UE, the base station may transmit, to the UE, second offset information representing an additional offset related to an offset between the lowest subcarrier of the lowest resource block of the SSB and a second reference point.

Here, the additional offset may be configured within a bandwidth part (BWP) configured to the UE. When a starting location of the BWP configured to the UE exceeds the first reference point, the additional offset may be transmitted to the UE.

Overview of Device to Which the Present Disclosure is Applicable

Figure 12:
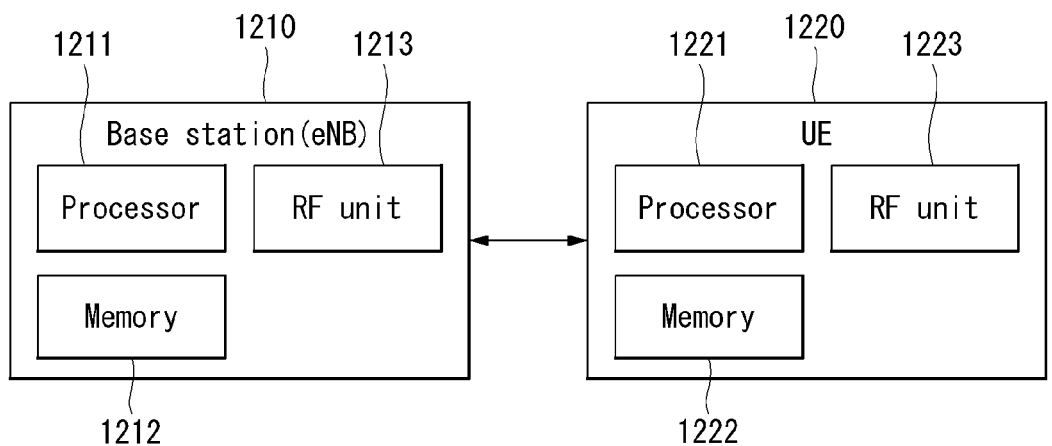
FIG. 12 illustrates a block configuration diagram of a wireless communication device to which methods described in the present disclosure are applicable.

FIG. 12 illustrates a block configuration diagram of a wireless communication device to which methods described in the present disclosure are applicable.

Referring to FIG. 12, a wireless communication system includes a base station 1210 and multiple UEs 1220 located in a region of the base station.

Each of the base station 1210 and the UE 1220 may be represented as a radio device.

The base station 1210 includes a processor 1211, a memory 1212, and a radio frequency (RF) module 1213.

The processor 1211 implements functions, processes, and/or methods described in FIGS. 1 to 11. Layers of radio interface protocol may be implemented by the processor 1211. The memory 1212 is connected to the processor 1211 and stores various types of information for driving the processor 1211. The RF module 1213 is connected to the processor 1211 and transmits and/or receives radio signals.

The UE 1220 includes a processor 1221, a memory 1222, and a RF module 1223.

The processor 1221 implements functions, processes, and/or methods described in FIGS. 1 to 11. Layers of radio interface protocol may be implemented by the processor 1221. The memory 1222 is connected to the processor 1221 and stores various types of information for driving the processor 1221. The RF module 1223 is connected to the processor 1221 and transmits and/or receives radio signals.

The memories 1212 and 1222 may be inside or outside the processors 1211 and 1221 and may be connected to the processors 1211 and 1221 through various well-known means.

Further, the base station 1210 and/or the UE 1220 may have a single antenna or multiple antennas.

Figure 13:
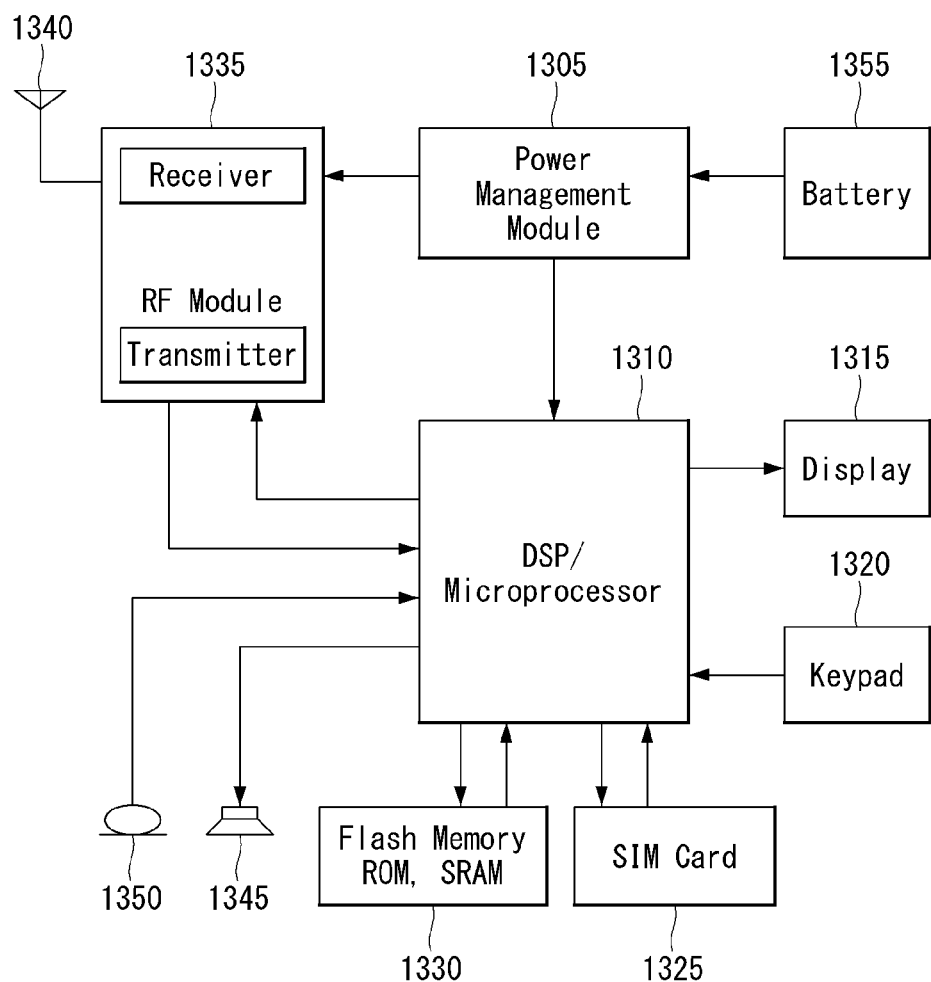
FIG. 13 illustrates a block configuration diagram of a communication device according to an embodiment of the present disclosure.

FIG. 13 illustrates a block configuration diagram of a communication device according to an embodiment of the present disclosure.

In particular, FIG. 13 illustrates in more detail the UE illustrated in FIG. 12.

Referring to FIG. 13, the UE may include a processor (or digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (which is optional), a speaker 1345, and a microphone 1350. The UE may also include a single antenna or multiple antennas.

The processor 1310 implements functions, processes, and/or methods described in FIGS. 1 to 11. Layers of a radio interface protocol may be implemented by the processor 1310.

The memory 1330 is connected to the processor 1310 and stores information related to operations of the processor 1310. The memory 1330 may be inside or outside the processor 1310 and may be connected to the processors 1310 through various well-known means.

A user inputs instructional information, such as a telephone number, for example, by pushing (or touching) buttons of the keypad 1320 or by voice activation using the microphone 1350. The processor 1310 receives and processes the instructional information to perform an appropriate function, such as to dial the telephone number. Operational data may be extracted from the SIM card 1325 or the memory 1330. Further, the processor 1310 may display instructional information or operational information on the display 1315 for the user's reference and convenience.

The RF module 1335 is connected to the processor 1310 and transmits and/or receives a RF signal. The processor 1310 forwards instructional information to the RF module 1335 in order to initiate communication, for example, transmit a radio signal configuring voice communication data. The RF module 1335 consists of a receiver and a transmitter to receive and transmit the radio signal. The antenna 1340 functions to transmit and receive the radio signal. Upon reception of the radio signal, the RF module 1335 may forward a signal to be processed by the processor 1310 and convert the signal into a baseband. The processed signal may be converted into audible or readable information output via the speaker 1345.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is obvious that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is obvious to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method for transmitting and receiving data in a wireless communication system according to the present invention has been described focusing on examples applying to the 3GPP LTE/LTE-A system and the 5G system (e.g., new RAT system), it can be applied to various wireless communication systems other than the above systems.

The invention claimed is:

1. A method of transmitting and receiving, by a user equipment (UE), data in a wireless communication system, the method comprising:

receiving a synchronization block (SSB) from a base station;

receiving, from the base station, first offset information representing an offset between (i) a lowest subcarrier of a lowest resource block of the SSB and (ii) a first reference point based on a specific subcarrier spacing;

receiving, from the base station, control information including (i) information regarding the specific subcarrier spacing and (ii) information regarding a difference between a subcarrier spacing based reference point, to which the SSB is received, and the first reference point;

configuring a grid of a common resource block (RB) based on the first offset information and the control information;

transmitting and receiving the data to and from the base station based on the common RB grid; and based on a starting location of a configured bandwidth part (BWP) being exceeding the first reference point, receiving, from the base station, second offset information representing an additional offset related to an offset between the lowest subcarrier of the lowest resource block of the SSB and a second reference point, wherein the additional offset is configured within the BWP configured to the UE.

2. The method of claim 1, wherein the additional offset represents an offset between the first reference point and the second reference point.

3. The method of claim 1, wherein the first offset information and the control information are received from the base station through system information.

4. The method of claim 3, wherein the system information is remaining minimum system information (RMSI).

5. A method of transmitting and receiving, by a base station, data in a wireless communication system, the method comprising:

transmitting a synchronization block (SSB) to a user equipment (UE);

transmitting, to the UE, first offset information representing an offset between (i) a lowest subcarrier of a lowest resource block of the SSB and (ii) a first reference point based on a specific subcarrier spacing;

transmitting, to the UE, control information including (i) information regarding the specific subcarrier spacing and (ii) information regarding a difference between a subcarrier spacing based reference point, to which the SSB is received, and the first reference point;

transmitting and receiving the data to and from the UE based on a grid of a common resource block (RB); and based on a starting location of a configured bandwidth part (BWP) being exceeding the first reference point, transmitting, to the UE, second offset information representing an additional offset related to an offset between the lowest subcarrier of the lowest resource block of the SSB and a second reference point, wherein the additional offset is configured within the BWP configured to the UE.

6. A user equipment (UE) configured to transmit and receive data in a wireless communication system, the UE comprising:

a transceiver configured to transmit and receive a radio signal; and at least one processor functionally connected to the transceiver, wherein the at least one processor is configured to control to:

receive a synchronization block (SSB) from a base station;

receive, from the base station, first offset information representing an offset between (i) a lowest subcarrier of a lowest resource block of the SSB and (ii) a first reference point based on a specific subcarrier spacing;

receive, from the base station, control information including (i) information regarding the specific subcarrier spacing and (ii) information regarding a difference between a subcarrier spacing based reference point, to which the SSB is received, and the first reference point;

configure a grid of a common resource block (RB) based on the first offset information and the control information;

transmit and receive the data to and from the base station based on the common RB grid; and based on a starting location of a configured bandwidth part (BWP) being exceeding the first reference point, receive, from the base station, second offset information representing an additional offset related to an offset between the lowest subcarrier of the lowest resource block of the SSB and a second reference point, wherein the additional offset is configured within the BWP configured to the UE.

* * * * *